United States Patent
Marra et al.

(10) Patent No.: US 7,673,568 B2
(45) Date of Patent: Mar. 9, 2010

(54) INTERFACE SYSTEM FOR WIRE DISTRIBUTED POWER

(75) Inventors: Jon M. Marra, Henderson, NY (US); Bryan M. McLaughlin, Watertown, NY (US); James R. Truglio, Watertown, NY (US); Dale R. Stevens, Adams Center, NY (US)

(73) Assignee: New York Air Brake Corporation, Watertown, NY (US)

( * ) Notice: Subject to any disclaimer, the term of this patent is extended or adjusted under 35 U.S.C. 154(b) by 196 days.

(21) Appl. No.: 11/511,365

(22) Filed: Aug. 29, 2006

(65) Prior Publication Data

US 2008/0053331 A1     Mar. 6, 2008

(51) Int. Cl.
   *B61C 1/00* (2006.01)
   *B61L 3/22* (2006.01)
(52) U.S. Cl. .................. 105/26.05; 246/167 R
(58) Field of Classification Search .............. 105/26.05; 246/167 R, 3, 4, 182 R; 303/3, 7, 15, 16
See application file for complete search history.

(56) References Cited

U.S. PATENT DOCUMENTS

| | | | |
|---|---|---|---|
| 3,560,055 A | 2/1971 | Worbois | |
| 4,652,057 A * | 3/1987 | Engle et al. | ............... 303/3 |
| 5,630,565 A | 5/1997 | Lumbis | |
| 5,647,562 A | 7/1997 | Lumbis et al. | |
| 5,673,876 A | 10/1997 | Lumbis et al. | |
| 5,681,015 A * | 10/1997 | Kull | ................ 246/187 C |
| 6,095,618 A * | 8/2000 | Heneka et al. | ................ 303/3 |
| 6,189,980 B1 | 2/2001 | Kull | |
| 6,217,126 B1 | 4/2001 | Kull | |
| 6,286,913 B1 | 9/2001 | Mazur et al. | |
| 6,361,124 B1 | 3/2002 | Marra et al. | |
| 6,401,015 B1 * | 6/2002 | Stewart et al. | ................ 701/19 |
| 6,626,506 B2 | 9/2003 | Kettle, Jr. | |
| 6,676,229 B1 | 1/2004 | Marra et al. | |
| 6,972,670 B2 | 12/2005 | LaDuc et al. | |
| 2003/0151520 A1 | 8/2003 | Kraeling et al. | |

* cited by examiner

*Primary Examiner*—S. Joseph Morano
*Assistant Examiner*—Robert J McCarry, Jr.

(57) ABSTRACT

A train is connected to provide wired distribution power (WDP) using at least one standard locomotive consist. The train includes a first locomotive separated from a second locomotive by a plurality of cars; and a communication train line connected to the locomotive and cars and extending through the train. Each of the locomotives has a propulsion system, a propulsion controller to control the propulsion system in response to one of operator propulsion signal and multi-unit (MU) propulsion signal, and a MU communication line and connector for communicating control signals, including the MU propulsion signal, with an adjacent locomotive. At least the first locomotive is connected to the communication train line of an adjacent car by the multi-unit connector of the first locomotive to one of receive and transmit the MU propulsion signals via the communication train line.

17 Claims, 3 Drawing Sheets

INTERFACE SYSTEM FOR WIRE DISTRIBUTED POWER

BACKGROUND AND SUMMARY OF THE INVENTION

The present invention relates generally to railway pneumatic brake systems and, more specifically, to an interface between a conventional locomotive control system and a train of electrically controlled pneumatic (ECP) brake equipped cars and wired distributed power (WDP) equipped locomotives.

An electrically controlled pneumatic (ECP) train is a train that is equipped with an intra-train communication (ITC) network linking brake control devices installed on cars and locomotives (vehicles) throughout the train. The primary function of the ECP system is to provide control and monitoring of train braking. A wired distributed power (WDP) train is a train that is equipped with locomotive control modules (LCMs) that provide the ability to control the traction and brake systems on remotely located locomotives via the ITC network. The primary function of the WDP system is to provide control and monitoring of locomotive traction and braking.

While a consist is physically adjacent locomotives, a multiple unit (MU) consist is a continuous block of physically adjacent locomotives that have been tied together by coupling the intra-locomotive electrical cables and pneumatic hoses thereby allowing the traction and braking of all locomotives in the consist to be controlled as one combined unit. An MU Controlled unit is a locomotive that receives its standard locomotive commands from the MU electric and pneumatic signals.

The freight train industry in the United States and other American Association of Railroads (AAR) countries are transitioning from a completely pneumatically-controlled train to a train having ECP brake equipment on their cars. For the foreseeable future, not all locomotives will have the capability of interfacing with an ECP equipped train. They do not have the ability to provide the necessary electrical power or electric control signals to the individual cars nor to control the brake pipe as required by the ECP cars. As presently configured ECP, the train brake pipe is maintained at its charged value and is only used as a pneumatic back-up for failure of the ECP electrical control signals.

To meet this demand, various systems have been suggested. A limp-in control arrangement for ECP systems is described in U.S. Pat. No. 6,286,913. An interface which provides the appropriate level of electrical power to the ECP train line from the MU electrical power line is described in U.S. Pat. No. 6,217,126. A locomotive to ECP brake conversion system which provides the appropriate electrical power from the MU electrical power line and control signals to the car train line from the brake pipe are described in U.S. Pat. No. 6,189,980 and U.S. Pat. No. 6,676,229.

With the advent of distributed power, the movement of longer, heavier trains has become a reality. Train operation has also been greatly improved by the addition of ECP technology which has coupled electronic train brake and distributed power. As detailed in U.S. Pat. No. 6,972,670, these technologies require the use of specialized locomotives, equipped with the required equipment. At least one ECP/WDP equipped locomotive is required in each consist. Locomotive availability, specific placement within the train, as well as the specific unit moves place a heavy burden on railroad operations to prepare a train for service.

Radio distributed power systems have been used prior to and with ECP trains. The ability to use non distributed power equipped locomotives on ECP trains has been limited to being in a consist with an ECP/WDP equipped locomotive.

Thus, the current technology requires the permanent installation of ECP and WDP control equipment on a given locomotive. As a result, the operating railroad will require specialize locomotives having ECP and WDP capability. This creates logistical problems in that these locomotives must first be available and then, they must be moved to a location where needed. Alternatively, the operating railroad could chose to equip all of their locomotives with this technology. In each case, these options could be costly to the railroad.

The present train is connected to provide WDP using at least one standard locomotive consist. The train includes a first, for example lead, locomotive separated from a second, for example remote, locomotive by a plurality of cars; and a communication train line connected to the locomotive and cars and extending through the train. Each of the locomotives has a propulsion system, a propulsion controller to control the propulsion system in response to one of operator propulsion signal and MU propulsion signal, and a multi-unit communication line and connector for communicating control signals, including the MU propulsion signal, with an adjacent locomotive. At least the first locomotive is connected to the communication train line of an adjacent car by the multi-unit connector of the first locomotive to one of receive and transmit the MU propulsion signals via the communication train line.

Both of the first and second locomotives may be connected to the communication train line of an adjacent car by the multi-unit connector of the locomotive to one of receive and transmit the MU propulsion signals via the communication train line.

The train includes a propulsion interface device connecting the multi-unit connector of the first locomotive to the communication train line of the adjacent car and converting the MU propulsion signal between formats of the communication train line and the multi-unit communication line. The second locomotive includes a wired distributed power system for transmitting and receiving a WD propulsion signals via the communication train line. The propulsion interface device converts between MU propulsion signals and WD propulsion signals; and the propulsion system of the second locomotive is responsive to received WD propulsion signals.

The cars may include electro-pneumatic brakes connected to the communication train line. One of the locomotives includes a brake controller connected to and transmitting braking signals on the communication train line. Each of the locomotives includes a brake controller connected to and sending pneumatic braking signals on a brake pipe that extends through the train. A brake interface may be connected to the brake pipe and the communication train line for monitoring the brake pipe and transmitting braking signals on the communication train line.

The present interface device is for connecting a conventional locomotive at its multi-unit connector to a communication train line of an adjacent car. The interface device includes a first interface for matting with a multi-unit connector and a second interface for matting with a communication train line. A translating device is connected between the first and second interfaces for translating MU propulsion signal between formats of the communication train line and the multi-unit communication line. The translating device also converts between MU propulsion signals and WDP propulsion signals. The interface device may be portable or permanently connected to a locomotive or an adjacent car.

These and other aspects of the present method will become apparent from the following detailed description of the method, when considered in conjunction with accompanying drawings.

DETAILED DESCRIPTION OF THE PREFERRED EMBODIMENTS

An ITC Lead Unit as used herein is the vehicle through which the train operator is able to electronically control all remote locomotives in the train via the Intra-Train Communications (ITC) Network. This unit or locomotive shall be responsible for generating commands to and receiving status information from the remote locomotives. An ITC Controlled Unit (also known as a remote unit) is the vehicle in a train that is not the lead vehicle, and is electronically controlled by signals sent to it by the lead vehicle via the ITC Network. This vehicle is responsible for controlling its MU consist based on commands from the lead. An ITC Trail Unit is the vehicle in a train that is electronically controlled by signals sent to it by the lead or remote locomotive via the electric and pneumatic MU signals. A Multiple Unit (MU) is a continuous series of locomotives that are controlled via inter-locomotive electrical and pneumatic signals. A Conventional Lead Unit is the vehicle through which the train operator is able to conventionally control all cars and trailing locomotives in the train. A Conventional Trail Unit is the vehicle in a train that is conventionally controlled by signals sent to it by the lead or remote locomotive via the electric and pneumatic MU train-lines. A Man-Machine Interface (MMI) is a device that provides input control, feedback display, and alarm mechanisms to the train operator.

Figure 1:
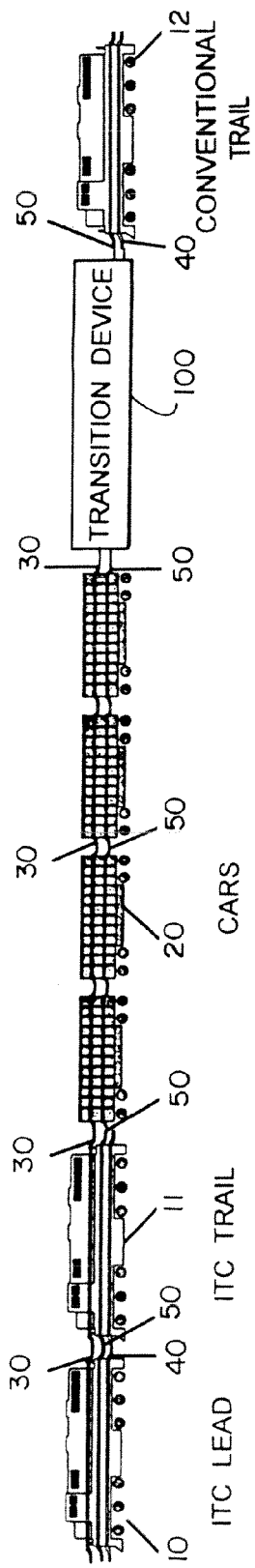
FIG. 1 is a schematic of a train including a WDP/ECP-equipped lead consist communicating with a remote non-equipped conventional locomotive having a transition device.
Figure 2:
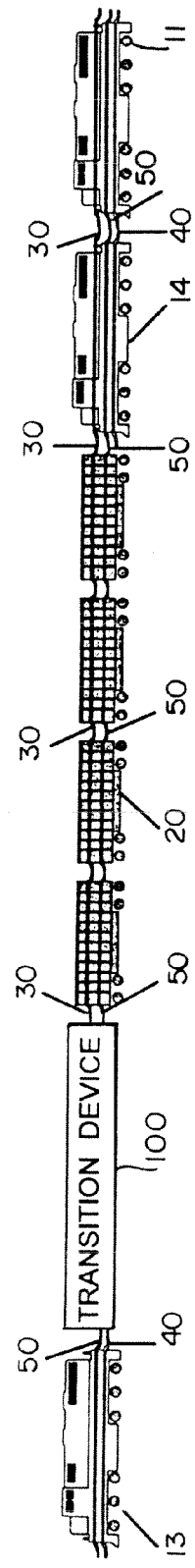
FIG. 2 is a schematic of a train including a lead non-equipped conventional locomotive communicating via transition device with a remote WDP/ECP-equipped consist.
Figure 3:
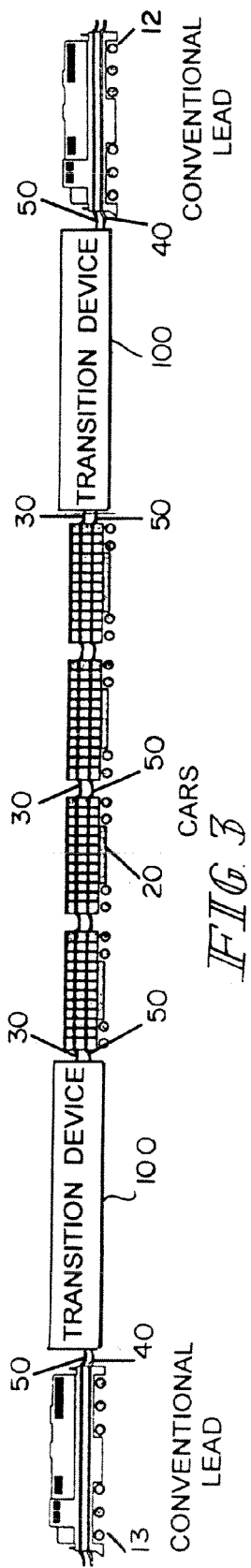
FIG. 3 is a schematic of a train including a lead non-equipped conventional locomotive communicating with a transition device to a remote non-equipped conventional locomotive also including a transition device.

A wired distributed power (WDP) train which includes electronically-controlled pneumatic (ECP) cars, can be configured with a single locomotive or multiple locomotives within the lead or remote consist of a train as illustrated in FIGS. 1, 2 and 3.

In FIG. 1, the first locomotive consist (lead consist) includes an ITC Lead locomotive 10 and an ITC Trail locomotive 11. The ITC Lead locomotive 10 is WDP and ECP equipped and is responsible for controlling the propulsion and brake systems of all the locomotives and cars within the train. The ITC Trail locomotive 11 is only ECP equipped and responds to commands received from the ITC network 30 and MU interface 40. The second locomotive consist (remote consist) includes a Transition Device 100 and a Conventional Trail locomotive 12. The Conventional Trail locomotive 12 is neither ECP nor WDP equipped and therefore relies on the Transition Device 100 interface to the ITC Network 30. The Transition Device 100 is ECP and WDP equipped and is responsible for receiving ITC Network commands 30 and translating them into MU commands 40 and train brake pipe commands 50 to the Conventional Trail 12.

In FIG. 2, the first locomotive consist (lead consist) includes Conventional Lead locomotive 13 and a Transition Device 100. The Convention Lead 10 is neither ECP nor WDP equipped and although responsible for controlling the propulsion and brake systems of all the locomotives and cars within the train, is incapable due to the electronic configuration of the train. Therefore, the Conventional Lead locomotive 13 requires a Transition Device 100 to receive the local MU commands 40 and train brake pipe commands 50 and translating them into ITC Network commands 30 to all cars and locomotives within the train. The second locomotive consist includes ITC Controlled 14 and ITC Trail locomotives 11. The ITC Controlled locomotive 14 is responsible for receiving the ITC network propulsion commands 30 and relaying them to the ITC Trail locomotive 11.

In FIG. 3, the first locomotive consist includes a Conventional Lead locomotive 13 and a Transition Device 100 and functions as described for FIG. 2. The second locomotive consist includes a Conventional Trail locomotive 12 and a Transition Device 100 and functions as described for FIG. 1.

Figure 4:
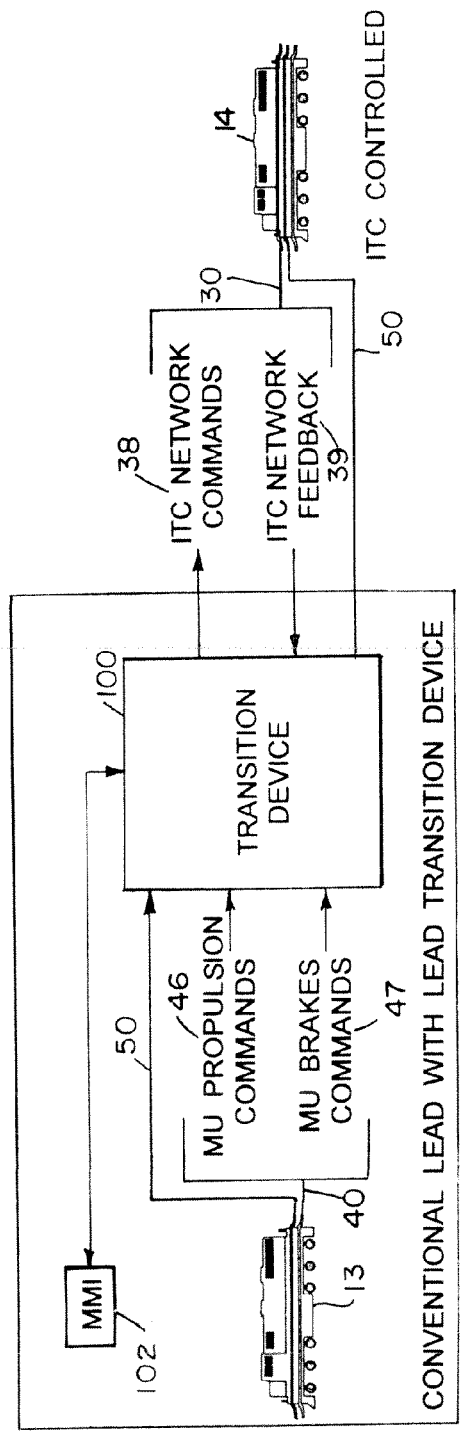
FIG. 4 is a schematic of a train including a lead non-equipped conventional locomotive and transition device communicating with a remote WDP/ECP-equipped locomotive.
Figure 5:
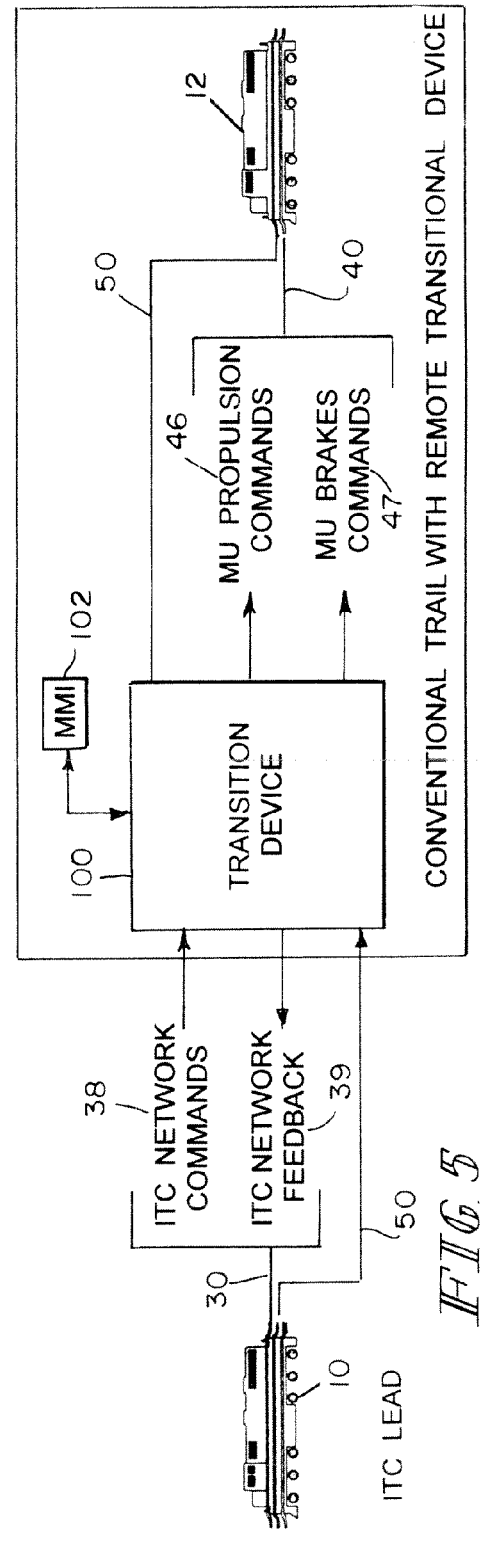
FIG. 5 is a schematic of a train including a WDP/ECP-equipped locomotive communicating through a transition device to a non-equipped conventional remote locomotive.

As illustrated in FIGS. 4 and 5, the Transition Device 100 interfaces the conventional locomotive with the ITC Network 30 via the MU Interface 40. The MU Interface 40 includes MU propulsion control signals (commands) 46 and MU pneumatic brake signals (commands) 47. The MU propulsion signals 46 include traction as well as dynamic brake commands for the propulsion system. The Transition Device 100 is connected to the ITC Network 30 and provides ITC Network commands 38 and receives ITC Network feedback (status) 39. Even though this is separately shown, these communications or commands are transmitted on a single ITC Network 30. The Transition Device 100 is an interface which converts MU commands signals 46 and 47 from a lead locomotive, for example, in FIG. 4, and provides ITC Network commands 38 on the ITC Network 30, as well as receiving ITC Network commands 38 in FIG. 5 and providing them as MU propulsion commands 46 and MU brake commands 47 in FIG. 5.

The Transition Device 100 interfaces to the locomotive's MU train-lines 46 and 47 to monitor the local locomotive commands, as well as convey ITC Network 30 translated network commands 38. The Transition Device 100 also interfaces to the ITC Network 30 to receive ITC Network commands 38 and receive ITC Network feedback 39. When installed with a remote Conventional Trail locomotive 12, the Transition Device 100 receives ITC Network commands 38 and translate them into propulsion 46 and pneumatic brake 47 commands that are understandable by the local locomotive. The local locomotive shall respond to these commands, as would a conventional trailing locomotive. When installed at a conventional lead locomotive 13, the Transition Device 100 receives propulsion 46 and pneumatic brake 47 MU train-line commands and translates them into ITC Network commands 38 and transmitted throughout the train via the ITC Network 30.

The Transition Device 100 includes a MMI 102 to provide train-wide operating status to the operator on the lead locomotive 13. The MMI 102 also provides the operator the ability to input set-up and control commands to the train system As illustrated in FIG. 5, the MMI 102 may be positioned in the cabin of the lead locomotive 13 and connected to the Transition Device 100 by radio or wire interface.

Figure 6:
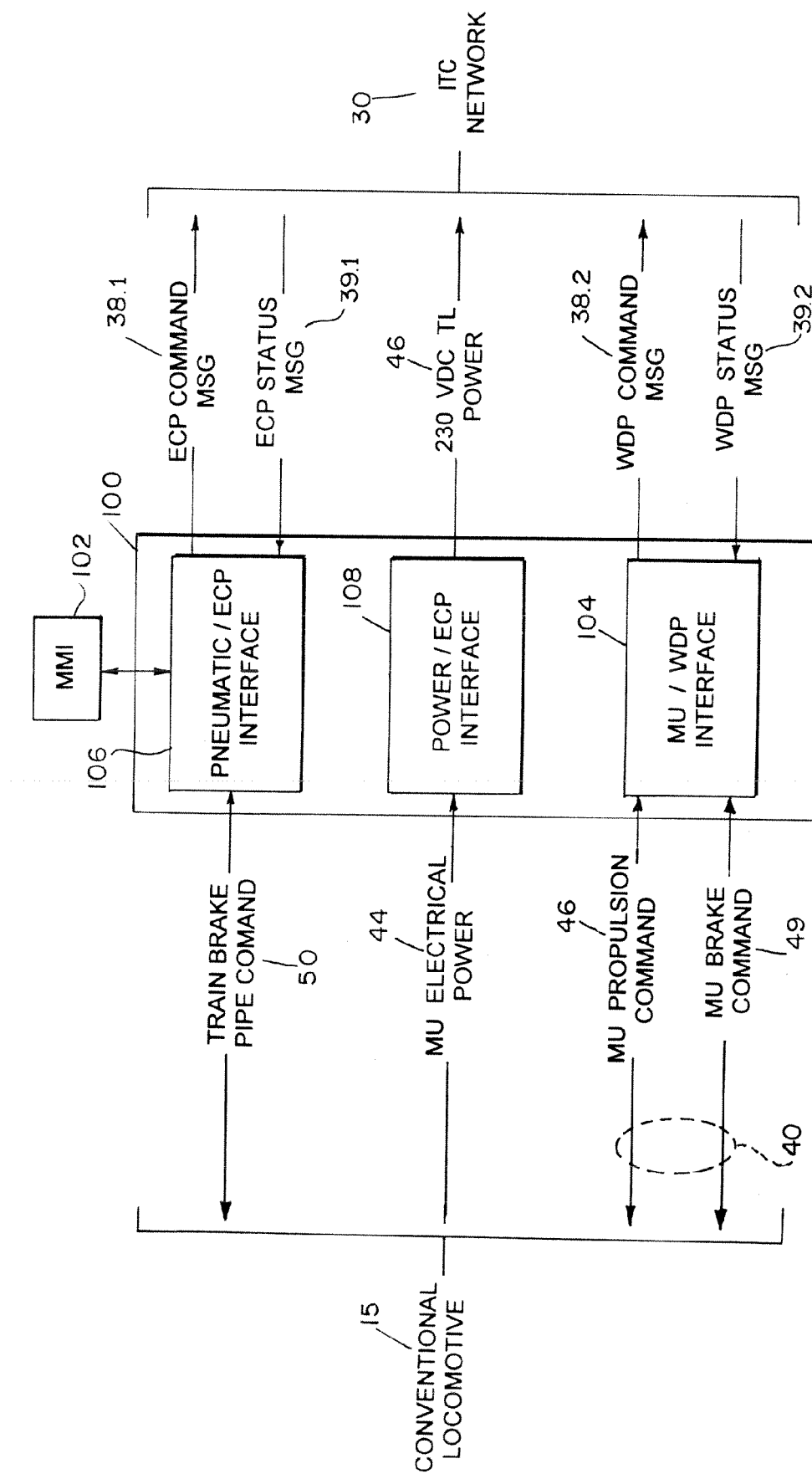
FIG. 6 is a block diagram of a transition device identifying the conventional MU to ITC network interface.

Details of the Transition Device 100 are illustrated in FIG. 6, including a WDP/MU interface unit 104. It is connected to the ITC Network 30 and transmits the ECP and WDP commands 38.1 and 38.2 and receives ECP and WDP feedback 39.1 and 39.2. On the other side, it is connected to the MU propulsion command 46 and the MU pneumatic brake command 47.

If the lead locomotive 15 is not ECP equipped, the ECP cars 20 and the ITC Network 30 require power. MU electrical power 44 is connected to a Power/ECP interface 108. The details of this interface can be found in U.S. Pat. No. 5,647,562 which is incorporated herein. This includes a voltage converter to raise the locomotive MU voltage up to that required for the ITC Network. Also, if the lead locomotive 15 has been adapted for ECP, the connection from the locomotive to the ECP network would be on a spare MU line 45 also described in the U.S. Pat. No. 5,647,562 patent.

If the lead locomotive 15 is not ECP-equipped, an additional Pneumatic/ECP interface 106 may be provided. The Pneumatic/ECP interface 106 monitors the train brake pipe 50 and produces appropriate commands onto the ITC Network 30. It also receives feedback and other status signals over the line 30. An example of such an interface system from a pneumatic to electronically-controlled pneumatic brake systems is described in U.S. Pat. No. 6,676,229 which is incorporated herein by reference.

If the non-WDP equipped lead locomotive 13 does have ECP capability, the interface device 100 would only include the MU/WDP interface 104, in which case the interface is readily mounted directly on the locomotive. Alternatively, the transition device 100 may be in a stand alone vehicle connected on the train. This may be necessary if the ECP interface 106 is required.

When configured at the lead position, the MU/WDP interface 106 monitors the lead locomotives MU propulsion 46 and brake 47 commands and transmits the translated commands 38 onto the ITC Network 30. It also receives feedback information 39 from the ITC Network 30. The MU/WDP interface 106 includes the capability to condition the received commands 46 and 47 based on operator input via the MMI 102 or in reaction to ITC Network feedback 39 prior to transmitting the resulting commands 38 onto ITC Network 30. When configured at the remote position, the MU/WDP Interface 106 monitors the ITC Network commands 38 and then translates the received commands into local MU propulsion 38 and brake 39 commands that can be interpreted by the Conventional Trail locomotive(s) 12.

The present Transition Device 100, when attached (interfaced) to a conventional locomotive, will provide the translation capability to allow a conventional locomotive to control or respond in kind within a train fitted with ECP train brake control and/or WDP propulsion and brake locomotive control on the ITC Network. The Transition Device 100 could be portable for attachment directly onto a conventional locomotive, or permanently installed onto a rail vehicle that must be accompanied by a conventional locomotive. The means of communication from the lead to the remote units could be provided by wire or radio communication media.

Although the present method has been described and illustrated in detail, it is to be clearly understood that this is done by way of illustration and example only and is not to be taken by way of limitation. The scope of the present method is to be limited only by the terms of the appended claims.

What is claimed:

1. A train comprising:
    a first locomotive separated from a second locomotive by a plurality of cars;
    an electrical communication train line extending through the cars and interconnecting the first and second locomotives;
    each of the locomotives having a propulsion system, a propulsion controller to control the propulsion system in response to one of an electrical operator propulsion signal and an electrical MU propulsion signal, and an electrical multi-unit communication line and connector for electrical communicating control signals, including the MU propulsion signal, with an adjacent locomotive; and
    at least the first locomotive being connected to the communication train line of an adjacent car by the multi-unit connector of the first locomotive to one of receive and transmit the MU propulsion signals via the communication train line
    wherein the cars include electro-pneumatic brakes connected to the communication train line, and one of the locomotives includes a brake controller connected to and transmitting braking signals on the communication train line.

2. The train according to claim 1, wherein the MU propulsion signal includes propulsion and dynamic braking.

3. The train according to claim 1, wherein both of the first and second locomotives are connected to the communication train line of an adjacent car by the multi-unit connector of the locomotive to one of receiver and transmit the MU propulsion signals via the communication train line.

4. The train according to claim 1, wherein the second locomotive includes a wired distributed power system for transmitting and receiving a WDP propulsion signals via the communication train line; the propulsion system of the second locomotive is responsive to received WD propulsion signals; the propulsion system of the first locomotive interpreting WDP propulsion signals as MU propulsion signals; and the propulsion system of the second locomotive interpreting MU propulsion signals as WDP propulsion signals.

5. The train according to claim 1, wherein the adjacent car does not include a propulsion system.

6. The train according to claim 1, wherein the adjacent car is a third locomotive with a propulsion system and an electrical communication train line in addition to an electrical multi-unit communication line.

7. A train comprising:
    a first locomotive separated from a second locomotive by a plurality of cars;
    an electrical communication train line extending through the cars and interconnecting the first and second locomotives;
    each of the locomotives having a propulsion system, a propulsion controller to control the propulsion system in response to one of an electrical operator propulsion signal and an electrical MU propulsion signal, and an electrical multi-unit communication line and connector for electrical communicating control signals, including the MU propulsion signal, with an adjacent locomotive; and
    a propulsion interface device connecting the multi-unit connector of the first locomotive to the communication train line of the adjacent car and translating the MU propulsion signal between formats of the communication train line and the multi-unit communication line.

8. The train according to claim 7, wherein the second locomotive includes a wired distributed power system for transmitting and receiving a WDP propulsion signals via the communication train line; the propulsion interface device converts between MU propulsion signals and WDP propulsion signals; and the propulsion system of the second locomotive is responsive to received WDP propulsion signals.

9. The train according to claim 7, wherein the cars include electro-pneumatic brakes connected to the communication train line, and one of the locomotives includes a brake controller connected to and transmitting braking signals on the communication train line.

10. The train according to claim 7, wherein the cars include electro-pneumatic brakes connected to the communication train line; each of the locomotives includes a brake controller connected to and sending braking signals on a brake pipe that extends through the train; and a brake interface connected to the brake pipe and the communication train line for monitoring the brake pipe and transmitting braking signals on the communication train line.

11. The train according to claim 7, including an operator input device connected to the interface device for reviewing signals received by the interface device and provides commands for signals to be transmitted by the interface device.

12. The train according to claim 7, where in the interface device is portable and removable attached to the first locomotive.

13. The train according to claim 7, where in the interface device is mounted on the adjacent car.

14. An interface device for connecting a conventional locomotive at its electrical multi-unit connector to an electrical communication train line of an adjacent car, the interface device comprising:
  a first interface for matting with an electrical multi-unit connector and a second interface, separate from the first interface, for matting with the electrical communication train line; and
  a translating device connected between the first and second interfaces for translating electrical MU propulsion signals between an electrical wire distributed power propulsion signal format of the electrical communication train line for other locomotives on the communication train line and an electrical multi-unit power propulsion signal format of the multi-unit communication line for an adjacent locomotive.

15. The interface device according to claim 14, wherein the locomotive includes a propulsion system and the adjacent car does not include a propulsion system.

16. The interface device according to claim 14, wherein the adjacent car is a second locomotive with an electrical communication train line in addition to an electrical multi-unit communication line.

17. The interface device according to claim 14, including a brake interface connected to the brake pipe and the communication train line for monitoring the brake pipe and transmitting braking signals on the communication train line.

\* \* \* \* \*

UNITED STATES PATENT AND TRADEMARK OFFICE
CERTIFICATE OF CORRECTION

| | |
|---|---|
| PATENT NO. | : 7,673,568 B2 |
| APPLICATION NO. | : 11/511365 |
| DATED | : March 9, 2010 |
| INVENTOR(S) | : Marra et al. |

Page 1 of 1

It is certified that error appears in the above-identified patent and that said Letters Patent is hereby corrected as shown below:

Column 8, lines 5 and 7, replace "matting" with "mating"

Signed and Sealed this

Twenty-first Day of September, 2010

David J. Kappos
*Director of the United States Patent and Trademark Office*